United States Patent [19]  
Babbin

[11] Patent Number: 4,559,095  
[45] Date of Patent: Dec. 17, 1985

[54] VULCANIZATION OF HOSE COMPOSITES PROTECTED WITH THERMOPLASTIC JACKETS

[75] Inventor: William R. Babbin, Barberton, Ohio

[73] Assignee: The B. F. Goodrich Company, Akron, Ohio

[21] Appl. No.: 618,177

[22] Filed: Jun. 7, 1984

[51] Int. Cl.$^4$ ...................... B32B 31/00; B32B 31/26; F16L 11/00
[52] U.S. Cl. ............... 156/244.13; 156/148; 156/244.24; 156/244.27; 156/247; 156/272.2; 156/275.5; 156/307.1; 156/344; 138/126; 138/141
[58] Field of Search ............... 156/148, 211, 218, 242, 156/244.11, 244.12, 244.13, 244.17, 244.18, 244.19, 244.27, 247, 244.24, 249, 267, 272.2, 273.7, 275.5, 294, 303.1, 307.1, 344; 138/125-126, 140-141, 149, 174; 428/36

[56] References Cited  
U.S. PATENT DOCUMENTS

| | | | |
|---|---|---|---|
| 3,255,284 | 6/1966 | Meislohn | 264/166 |
| 3,684,602 | 8/1972 | Ball | 156/149 |
| 3,883,384 | 5/1975 | Hopkins | 156/149 |
| 4,099,425 | 7/1978 | Moore | 156/149 |
| 4,104,098 | 8/1978 | Hush et al. | 156/273.3 |
| 4,130,535 | 12/1978 | Coran et al. | 524/487 |
| 4,238,260 | 12/1980 | Washkewicz | 138/125 |
| 4,311,628 | 1/1982 | Abdou-Sabet et al. | 524/447 |

OTHER PUBLICATIONS

Richardson, P. N., "Nylon", Modern Plastics Encyclopedia, 1977-1978, pp. 36-42.

Primary Examiner—Edward Kimlin  
Assistant Examiner—Merrell C. Cashion, Jr.  
Attorney, Agent, or Firm—James R. Lindsay; Daniel J. Hudak

[57] ABSTRACT

A method is described for curing an elastomeric tubular article having a thermoplastic jacket thereon. The curing is achieved either by heat or by microwave radiation. After curing, the thermoplastic jacket is removed.

14 Claims, 2 Drawing Figures

VULCANIZATION OF HOSE COMPOSITES PROTECTED WITH THERMOPLASTIC JACKETS

TECHNICAL FIELD

The present invention relates to a vulcanization process and product therefrom for curing an elastomeric tubular article having a thermoplastic jacket thereon. The curing is achieved either by heat or by microwave radiation. After curing, the thermoplastic jacket is removed.

BACKGROUND ART

Heretofore in the manufacture of hoses, such as rubber hoses, the outer layer of such, when not protected as before vulcanization thereof, was readily deformable and easily marked. During vulcanization, deformity was also caused by the weight of the hose itself and also when layers of a coiled hose were placed upon one another. Damage from scuffing as well as from imperfections in a pan also occurred when the hose was placed in a vulcanizing pan. A clean and smooth hose surface is desired for a final product.

The prior art has attempted to overcome some of the above disadvantages by providing a removable, protecting hose covering which remained thereon during vulcanization. Typically, such covering was made of lead. However, due to the fact that lead is heavy, not flexible, expensive, and poses EPA problems, it has many drawbacks.

In U.S. Pat. No. 3,255,284, a nylon sheath was extruded over the hose prior to vulcanization and remained thereon during vulcanization. However, nylon is slow in extruding, relatively stiff, can be reused only a limited number of times, and is highly sensitive to moisture.

U.S. Pat. No. 3,883,384 relates to a protective sheath of a non-vulcanizable rubber-like material such as EPDM, that is a terpolymer of ethylene, propylene, and a diene; EPM, a copolymer of ethylene and propylene; or CSE, that is chlorosulfonyl-polyethylene. Although such materials have been utilized, they are not desirable since the ability to be removed from a vulcanized hose and recycled is limited. Moreover, the above prior art patents fail to teach or suggest the utilization of a microwave transparent thermoplastic material.

U.S. Pat. No. 4,379,011 merely relates to a method of making arched V-Belts and does not utilize any protective sheath or suggest microwave curing.

U.S. Pat. No. 4,378,622 relates to a method of making a compressible printing roller wherein a microporous inner layer exists. A cover 16 exists about said microporous layer.

U.S. Pat. No. 4,130,535 relates to blends of olefin rubber and thermoplastic olefin resin in which the rubber is completely cured.

U.S. Pat. No. 4,311,628 relates to a similar blend which is cured with a phenolic curative.

U.S. Pat. No. 4,380,606 relates to a blend of a neutralized acrylic copolymer rubber and polyvinylchloride.

The above prior art patents all lack any suggestion of a thermoplastic jacket to protect, smooth and compact the hose composition undergoing vulcanization as by a microwave curing process.

DISCLOSURE OF THE INVENTION

It is therefore an aspect of the present invention to provide a vulcanization process for tubular rubber articles whereby prior to vulcanization, a thermoplastic composition is coated about said article.

It is another aspect of the present invention to provide a vulcanization process as above, wherein said tubular article can be vulcanized by heat or by microwave radiation.

It is yet another aspect of the present invention to provide a vulcanization process, as above, wherein after vulcanization, said thermoplastic coating is removed.

It is a further aspect of the present invention to provide a vulcanization process, as above, wherein said tubular article is protected during vulcanization and has a smooth coating.

It is a still further aspect of the present invention to provide a vulcanization process, as above, wherein said thermoplastic material can be a blend of an olefin rubber and a polyolefin resin.

These and other aspects of the present invention will become apparent from the following detailed description of the invention.

BEST MODE FOR CARRYING OUT THE INVENTION

Figure 1:
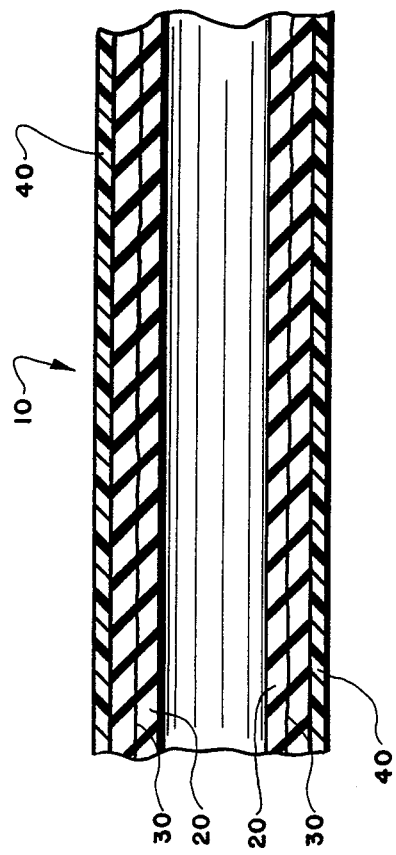
FIG. 1 is a cross-sectional view of a coated article of the present invention.

The present invention relates to a vulcanization process for curing a tubular elastomeric article such as for example, a hose, conduit, tubing or the like. Any conventional or common elastomeric material can be utilized which has heretofore been utilized with regard to making such articles. Examples of such elastomers include neoprene, EPDM, i.e., ethylene-propylene-diene terpolymer, SBR, i.e., styrene-butadiene rubber, nitrile rubber, and chlorinated polyethylene.

As well known to the art, hoses, tubes, and the like are often laminates of various different materials and include one or more various reinforcing layers such as fabric, wire, or the like. When a textile is utilized as a reinforcing material, it can be nylon, polyester, rayon, and the like. A reinforcing wire typically is coated steel such as brass-plated steel, etc., copper-coated steel, although various other metals can also be utilized. The type of hose, type of composition thereof, type of reinforcement, the various type of layers, and the like generally do not form a part of this invention.

According to the concepts of the present invention, a thermoplastic jacket material is applied to said tubular elastomeric article. Generally, suitable thermoplastic materials include thermoplastic compounds or blends which are generally transparent with regard to microwave radiation. In other words, microwave radiation easily penetrates such material and thus does not cause any significant increase in the temperature of said transparent material. A suitable thermoplastic material comprises a blend of polyolefin resin and monoolefin copolymer rubber characterized by the rubber being fully cured but the blends nevertheless being processable as a thermoplastic. Such a thermoplastic blend contains from about 25 to about 100 percent by weight of the resin and from about 75 to about 0 or 1 percent by weight of the rubber. Desirably, the blend contains from about 50 percent to about 100 percent by weight of the resin and from about 50 percent to about 0 or 1 percent by weight of the rubber with from about 75 to about 99 percent by weight of resin and from about 25 percent to about 1 percent by weight of rubber being preferred.

Suitable monoolefin copolymer rubber comprises essentially non-crystalline, rubbery copolymer of two or more alpha monoolefins, preferably copolymerized with at least one polyene, usually a diene. However, saturated monoolefin copolymer rubber, commonly called EPM rubber, can be used, for example copolymers of ethylene and propylene. Examples of unsaturated monoolefin copolymer rubber, commonly called EPDM rubber, which are satisfactory comprise the products from the polymerization of monomers comprising two monoolefins, generally ethylene and propylene, and a lesser quantity of non-conjugated diene. Suitable alpha monoolefins are illustrated by the formula $CH_2=CHR$ in which R is hydrogen or alkyl of 1-12 carbon atoms, examples of which include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 5-methyl-1-hexene, 1,4-ethyl-1-hexene and others. Satisfactory non-conjugated dienes have from 5 to 12 carbon atoms and include straight chain dienes such as 1,4-hexadiene, cyclic dienes such as cyclooctadiene and bridged cyclic dienes such as ethylidene norbornene. Grades of EPM and EPDM rubbers suitable for the practice of the invention are commercially available, Rubber World Blue Book 1975 Edition, Materials and Compounding Ingredients for Rubber, pages 403, 406–410. The amount of diene ranges from about 0 or 1 percent to about 10 percent by weight, with from about 3 to 6 percent by weight based upon the total weight of said rubber copolymer being preferred.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resin, and desirably polyethylene or polypropylene, can be advantageously used in the practice of the invention, with polypropylene being preferred.

Such blends of polyolefin resins and olefin rubber are set forth in U.S. Pat. No. 4,130,535 which is hereby fully incorporated by reference with regard to all aspects thereof. It is also noted that such blends can contain conventional curing agents therein as set forth in said patent. Moreover, they may contain conventional compounding ingredients such as carbon black, silica, titanium dioxide, pigments, clay, zinc oxide, stearic acid, accelerators, and the like, as set forth in said U.S. patent. Moreover, said blend can be extended with oil, such as aromatic, naphthenic or paraffinic oils as set forth in said U.S. patent. Typically, from about 0 or 5 to about 300 parts by weight of oil, desirably from about 30 to about 250 parts by weight and preferably from about 70 to about 200 parts by weight per 100 parts by weight of said rubber blend are utilized. Said patent is also further incorporated by reference with regard to the amount of oil present when the amount of resin is greater than 75 percent by weight, and also with regard to the particle size of the rubber, the tensile strength of the vulcanized blend as compared to the unvulcanized blend and the like. Moreover, such blends, when cured with a phenolic curative, exhibit superior oil resistance, as set forth in U.S. Pat. No. 4,311,628 which is hereby fully incorporated by reference with regard to all aspects thereof.

Other suitable thermoplastic resins which can be utilized in the present invention include polymethylpentene. Ultra high molecular weight polyethylene can also be utilized. This compound has been defined by ASTM as those linear polyethylenes which have a relative viscosity of 2.3 or greater at a solution concentration of 0.05 percent at 135° C. in decahydronaphthalene. Nominal weight average molecular weight is from about three million or higher, as from about three million to about 6 million. Yet another polymer which can be utilized in the present invention as a jacket cover material is fluorinated ethylene propylene copolymer. This fluoroplastic is available from the DuPont Company. Another polymer is polyphenylsulfide which is available from the Phillips Petroleum Company. Segmented polyesters can also be utilized such as Hytrel, which is a product of DuPont. However, the blend of a polyolefin resin and a monoolefin copolymer rubber as set forth above is preferred, due to ease of stripping, cost considerations, as well as recyclability. That is, the blend can be readily pelletized and once again utilized to form a jacket covering on another tubular article.

The above thermoplastic compounds or materials are generally transparent to microwave radiation, that is to electromagnetic radiation having a wave length of from about 2200 MHz to about 2600 MHz and preferably from about 2400 to about 2500 MHz. By essentially transparent is meant that said thermoplastic converts very few of said microwaves into energy and thereby permits substantial amount of said waves to essentially pass therethrough.

Figure 2:
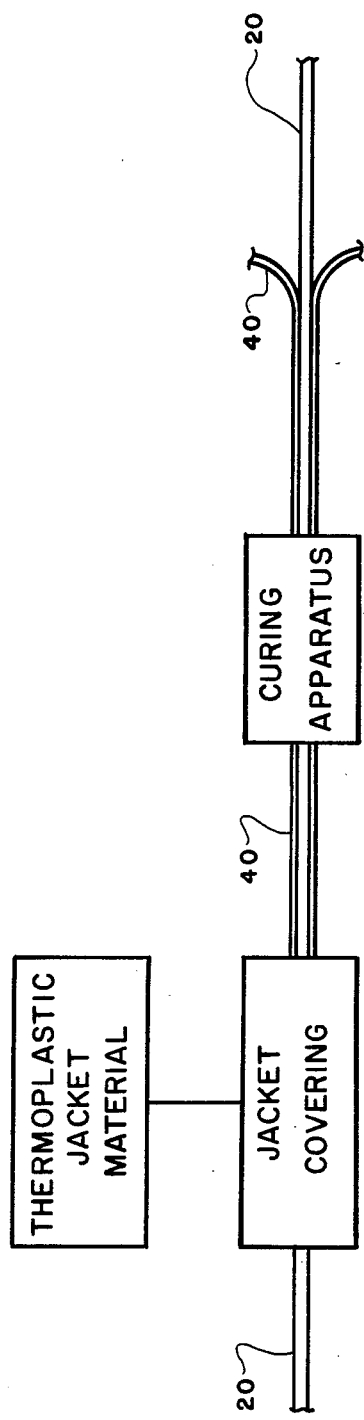
FIG. 2 is a block diagram showing the coating, curing, and stripping process steps of the present invention.

Referring to FIG. 1, a jacketed or coated article is generally indicated by the number 10. Tubular article 20 is shown having a reinforcing element 30 therein. By tubular, it is meant, generally round, circular, eliptical, etc. Thermoplastic material 40 forms a jacket about said tubular article. The thermoplastic jacket can be applied in any conventional manner. A schematic diagram of one such application is shown in FIG. 2. Tubular article 20 is fed to a jacket covering device, such as an extruder, wherein jacket material 40 is applied thereto. The jacketed tubular article is then fed to any curing apparatus, such as a steam autoclave, hot air oven, or a microwave radiation generating device. The resident time in the curing apparatus is such that rubber article 30 is suitably cured. Upon exit from said curing apparatus, jacket 40 can be cut and stripped off thereby exposing cured tubular article 20. The jacket material can be recycled for later use. Of course, numerous variations of this process may be utilized. For example, once jacket material 40 has been applied to tubular article 20, it can be initially subjected to microwave radiation until tubular article 20 is brought up to cure temperature. At that point in time, it can be transferred to a heating oven, such as a hot air oven and further heated until tubular article 20 is effectively cured. Moreover, such a process can occur continuously as tubular article 20 moves therethrough, or to a length of such article which is coiled about itself and placed in the curing apparatus. The curing temperature will vary depending upon the type of rubber utilized and generally is from about 280° F. to about 350° F.

Jacket 40 serves to protect, compact as well as yield a smooth tubular article surface during vulcanization. Since thermoplastic material is largely rigid as opposed to the elastomeric rubber article, the thickness thereof is rather small. Naturally, such thickness will vary with the overall outside diameter of the tubular rubber articles but is generally from about 1/10 to about ¼ inch. Since the tubular rubber article is protected by the thermoplastic jacket, upon cure it will not have a flat portion thereto. Moreover, it will not be subjected to scrapes, nicks, dents, grooves, or the like before or during the vulcanization process. Additionally, the surface thereof which bears against the inside surface of said jacket is generally smooth. Optionally, the internal opening or aperture of said tubular article can also be filled with said thermoplastic material either before, during, or after application of the jacket material thereto. Utilization of such a plug of said thermoplastic material further serves to compact said elastomeric article material as well as to yield a smooth interior surface. In lieu of an internal plug, said tubular article can be inflated with a fluid, for example air, during the vulcanization process. Such inflation fluid which is usually a low amount of pressure, as for example from about 1 to about 25 psig, and also serves to maintain the circular cross-sectional shape of said tubular article during cure as well as to yield a smooth interior surface. Any conventional pressurizing method or apparatus can be utilized.

The curing apparatus can generally be any conventional apparatus which provides heat, such as a hot air oven, a steam bath, or steam autoclave, and the like. Moreover, it can be a microwave radiation device as noted above which generates such radiation within said above-noted wave length range whereupon striking said tubular article, it heats said article to a curing temperature but impacts very little heat to said jacket. Another method of vulcanizing involves collecting and winding the tubular article on a large reel. When the jacket has been sufficiently cooled, a steam inlet is inserted into one end of the tubular article and a steam outlet and trap is inserted into the opposite end. To effect vulcanization, steam under pressure is admitted to one side of the tubular article. Thus, the steam not only supplies necessary heat but also pressure thereby forcing the tubular article against the thermoplastic jacket resulting in a smooth, compacted hose composite.

In addition to the above-noted advantages such as production of a tubular article having a smooth surface thereon, the present invention also improves adhesion between the various layers of the laminate.

The present invention will be better understood by reference to the following examples.

EXAMPLE 1

A gasoline rubber pump hose was manufactured as set forth hereinbelow via extrusion of a tube or an inner hose material, a reinforcement about said hose material, a cover extrusion about said reinforcement material, and the application of a jacketing material thereto in the following manner:

| Tube Extrusion Curb Pump Hose ¾ Inch | |
|---|---|
| Compound used | nitrile rubber |
| Extruder zone temperatures | 1 + 2 = 150° F. 3 = 180° F. |
| Extruder head pressure | 1100–1200 pounds |
| Stock discharge temperature | 230° F. |
| Extrusion rate | 8'/min. |
| Pin & die | 0.760"/0.940" |
| Size: ID × OD - Actual | approx. .780" × .980" |
| Die swell | .062" |
| Cooling | water |
| Dip used | none |
| Comments: | |
| screw temperature - cold | |
| head temperature - 170° F. | |
| die temperature - 200° F. | |

A polyester reinforcement was then applied about said nitrile rubber tube in the following manner:

| Reinforcement | |
|---|---|
| Braid former dimension | 1.000" |
| Braid former stroke | 3/32" |
| Braiding rate | 12 FPM |
| Braided length | 160' |
| Comments: | |
| Gears | 54/67 |
| Yarn | polyester |
| Tension | out-5.5 lbs. in-4.0 lbs. |
| Cable & yoke length | 10⅝" |
| Pitch | 2.005" |
| Pitch after inflation @ 1 psi | 2.005" |

A neoprene cover was then applied to said braided tube.

| Cover Extrusion | |
|---|---|
| Compound used | neoprene |
| Extruder zone temperatures | 1-2-3 = 150° F. |
| Extruder head pressure | 1100 pounds |
| Stock discharge temperature | 215° F. |
| Extrusion rate | 8'/min. |
| Pin & die | .975/1.125" |
| Size: ID × OD - Actual | OD = 1.122 |
| Die swell | .005" |
| Cooling | water |
| Dip used | none |
| Vacuum used | 15" |
| Comments: | |
| screw temperature - cold | |
| head temperature - 200° F. | |
| die temperature - 200° F. | |
| Braided tube before cover: OD - | no air 1.025"* |
| | 1 psi 1.030"* |

*Tube when made was OD = .980". Tube set around for a period of days. OD grew to 1.025"
No air - 1.030" @ 1 psi. OD over braid.

A blend of a polyolefin resin and a monoolefin copolymer rubber was applied. Such a material was purchased from the Monsanto Chemical Company under the trade name Santoprene 203-50 and applied as follows:

| Santoprene Jacket Processing | |
|---|---|
| Compound used | Santoprene, 203–50, manufactured by Monsanto |
| Extruder zone temperatures | 1 = 190° F., 2 = 410° F., 3-4-5 = 415° F. |
| Stock discharge temperature | 387° F. |
| Extrusion rate | 28 RPM 7–8 FPM |
| Pin & die | modified 1.220"/1.150" |
| Size: OD | 1.370"–1.400" |

-continued

Santoprene Jacket Processing

| | |
|---|---|
| Cooling | hose @ 1.125 = thickness, approximately .130" water |
| Vacuum used | 15" |
| Comments: | |
| Die temperature - 1-2-3 = 400° F. | |
| Melt temperature - 400° F. | |

EXAMPLE 2

In a similar manner as set forth in Example 1, another hose laminate was prepared and a Santoprene jacket applied thereto.

EXAMPLE 3

In this example, a Santoprene mandrel or plug was first formed. About this plug, the gasoline pump hose was laminated and a jacket applied thereto. The preparation of the core or plug was as follows:

Tube Over Santoprene Mandrel Gasoline Curb Pump Hose ⅜"

| | |
|---|---|
| Compound used | nitrile |
| Extruder zone temperatures | 1-2-3 = 150° F. |
| Extruder head pressure | 1100–1200 pounds |
| Extrusion rate | 8'/min. |
| Pin & die | .750/.985" |
| Size: ID × OD - Actual | .750 × .985 |
| Die swell | .145" |
| Cooling | water |
| Dip used | none |
| Comments: | |
| screw temperature - cold | |
| head temperature - 200° F. | |
| die temperature - 200° F. | |

In a manner exactly identical to Example 1, a nitrile inner rubber layer, a polyester braid, and a neoprene rubber was prepared and then covered with the Santoprene jacketing process.

The hoses of Example 1, 2 and 3 were then cured in a manner, differential pressure, temperature, and time, as set forth in Table I. Also included are comments on visual surface appearance and the like. The Santoprene material was of the nature as set forth in U.S Pat. No. 4,130,535.

TABLE I

| Experiment | Curing Process | Comments |
|---|---|---|
| Example 1 Control | Autoclave/Differential Air at 10 psig, 300° F./50 min. | Dimpled tube/surface braid shadow. Sample shrunk 1.46% in length. |
| Example 1 Santoprene Jacket | Autoclave/Differential Air at 10 psig/Santoprene Jacket, 300° F./50 min. | Good appearance. Sample grew 0.3% in length |
| Example 2 Control | Autoclave/Differential Air at 15 psig, 300° F./50 min. | Dimpled tube/surface braid shadow, no length change. |
| Example 2 Santoprene Cover | Autoclave/Differential Air at 15 psig/Santoprene Jacket, 300° F./50 min. | Good appearance, no length change. |
| Example 3 Control | Autoclave Mandrel Built 300° F./50 min. | Smooth tube/knubby surface. Sample shrunk 1.87% in length. |
| Example 3 Santoprene Jacket | Autoclave Mandrel Built/Santoprene Jacket, 300° F./50 min. | Smooth tube and surface. Sample grew 1.15% in length. |

As apparent from Table I, the rubber hose containing the thermoplastic jacket generally had a good smooth appearance, whereas the control was knubby, dimpled, showed surface braid shadow, and the like. Thus, the thermoplastic jacket readily resulted in a hose having a smooth surface and an overall good appearance. Generally, the adhesion of the nitrile rubber layer to the reinforcement as well as the cover to the reinforcement was about the same or better in the thermoplastic jacket example as compared to the control.

A microwave cure was carried out in the following manner.

EXAMPLE 4

In a manner exactly identical to Example 1, a gasoline rubber hose was prepared. With regard to curing, the hose was placed in a microwave generating apparatus, generating a wave length of about 2,450 MHz for approximately 30 to 180 seconds. The microwave radiation rapidly heated the hose material to curing temperature, at which time it was removed from the microwave generating apparatus and placed in a hot air oven for approximately 30 to 40 minutes at about 307° F. The thermoplastic jacket was then removed. The surface generally had a good appearance and was smooth.

While in accordance with the patent statutes a best mode and preferred embodiment has been set forth, the scope of the invention is not limited thereto but rather to the scope of the attached claims.

What is claimed is:

1. A process for curing an elastomeric tubular article, comprising the steps of:

applying a recyclable thermoplastic jacket around the elastomer tubular article, said thermoplastic jacket being a material selected from the group consisting of polymethylpentane, high molecular weight polyethylene, fluoronated ethylene propylene copolymer, segmented polyesters, polyphenylsulfide, and a blend of a material having from about 25 to about 100 percent by weight of a thermoplastic polyolefin resin and from about 75 percent to about 0 or 1 percent by weight of a vulcanized monoolefin copolymer rubber based upon the total weight of said resin and said rubber, and from about 0 to about 300 parts by weight of oil based upon the total weight of said resin and said rubber, provided that when the amount of resin is greater than 75 percent by weight, said oil must be present in an amount sufficient to satisfy the equation $(W_o+W_r)/W_p$ is equal to or greater than 0.33 wherein $W_o$ is the weight of oil, $W_r$ is the weight of rubber, and $W_p$ is the weight of resin, wherein said polyolefin resin is a polymer of one or more olefins having from 2 to 8 carbon atoms, and wherein said monoolefin copolymer rubber is a polymer made from two or more alpha monoolefins having the formula $CH_2=CHR$ in which R is hydrogen or an alkyl of from about 1 to 12 carbon atoms, and from about 0 to about 10 percent by weight based upon the total weight of said alpha monoolefins of a diene having from 5 to 12 carbon atoms;

compacting and curing said elastomeric tubular article; and removing said thermoplastic jacket from said tubular article.

2. A process according to claim 1, wherein said cure is achieved by heating said tubular article.

3. A process according to claim 2, including applying pressure to the interior of said tubular article during curing.

4. A process according to claim 3, including applying a thermoplastic plug to the interior of said tubular article before curing said tubular article.

5. A process according to claim 2, wherein said thermoplastic material is said blend of said polyolefin resin and said monoolefin copolymer rubber, said polyolefin resin being a polymer made from monomers having 2 or 3 carbon atoms, said monoolefin copolymer rubber is EPDM rubber which is a product from the polymerization of ethylene, propylene, and from about 3 to about 6 percent by weight of said diene, and wherein the amount of oil, when utilized, is from about 30 to about 250 parts by weight.

6. A process according to claim 5, wherein said diene is ethylidenenorbornene.

7. A process according to claim 5, wherein said polyolefin resin is polypropylene.

8. A process according to claim 7, wherein said diene is ethylidenenorbornene.

9. A process according to claim 1, wherein said curing is achieved by applying microwaved radiation to said jacketed tubular article.

10. A process according to claim 9, wherein said microwave radiation ranges from about 2,200 MHz to about 2,600 MHz.

11. A process according to claim 10, including applying pressure to the interior of said tubular article during curing.

12. A process according to claim 10, including applying a thermoplastic plug to the interior of said tubular article.

13. A process according to claim 10, wherein said thermoplastic material is said blend of said polyolefin resin and said monoolefin copolymer rubber, said polyolefin resin being a polymer made from monomers having 2 or 3 carbon atoms, said monoolefin copolymer rubber is EPDM rubber which is a product from the polymerization of ethylene, propylene, and from about 3 to about 6 percent by weight of said diene, and wherein the amount of oil, when utilized, is from about 30 to about 50 parts by weight.

14. A process according to claim 13, wherein said resin is polypropylene and wherein said diene of said monoolefin copolymer rubber is ethylidene norbornene.

* * * * *